US011897524B2

United States Patent
Liu et al.

(10) Patent No.: US 11,897,524 B2
(45) Date of Patent: Feb. 13, 2024

(54) OVERLOAD AND UNBALANCED LOAD DETECTING SYSTEM FOR RAILWAY AND DETECTING METHOD

(71) Applicant: BEIJING ORIENTAL RAILWAY TECHNOLOGY DEVELOPMENT CO., LTD., Beijing (CN)

(72) Inventors: Xiaobing Liu, Beijing (CN);
Xiangsheng Pang, Beijing (CN);
Zhiqiang Wang, Beijing (CN);
Jianming Fu, Beijing (CN); Chao Guo, Beijing (CN)

(73) Assignee: BEIJING ORIENTAL RAILWAY TECHNOLOGY DEVELOPMENT CO., LTD., Beijing (CN)

( * ) Notice: Subject to any disclaimer, the term of this patent is extended or adjusted under 35 U.S.C. 154(b) by 888 days.

(21) Appl. No.: 16/925,282

(22) Filed: Jul. 9, 2020

(65) Prior Publication Data

US 2020/0339167 A1    Oct. 29, 2020

Related U.S. Application Data

(63) Continuation of application No. PCT/CN2018/072024, filed on Jan. 10, 2018.

(51) Int. Cl.
*B61L 1/06* (2006.01)
*B61L 23/04* (2006.01)
(Continued)

(52) U.S. Cl.
CPC ............ *B61L 1/06* (2013.01); *B61L 23/047* (2013.01); *B61L 27/57* (2022.01); *G01G 19/047* (2013.01); *G01L 1/04* (2013.01)

(58) Field of Classification Search
CPC .......... B61L 1/06; B61L 27/57; B61L 23/047; G01L 1/04
See application file for complete search history.

(56) References Cited

U.S. PATENT DOCUMENTS 4,353,068 A * 10/1982 Fernandez ............. B61L 13/02
73/507
4,964,793 A * 10/1990 Antosh ................. E01B 25/305
104/118
(Continued)

FOREIGN PATENT DOCUMENTS

AU           620081       2/1992
CN          2304111       1/1999
(Continued)

OTHER PUBLICATIONS

Deng et al., Applications of fiber optic sensors in civil engineering, Structural Engineering and Mechanics, vol. 25, No. 5 (2007) (Year: 2007).*

(Continued)

*Primary Examiner* — Peter Radkowski
(74) *Attorney, Agent, or Firm* — COOPER LEGAL GROUP, LLC (57) ABSTRACT

This application relates to an overload and unbalanced load detecting system for a railway and a detecting method. This system includes at least one steel rail. A rail web of each steel rail is provided with two sampling points at two sides between every two adjacent rail sleepers, respectively, and the two sampling points on one side are symmetrically disposed about the steel rail with respect to the two sampling points on the other side. A fiber-optic sensitive element used for continuously measuring a load when a train passes through the two sampling points is obliquely fixed at each sampling point, and two fiber-optic sensitive elements on the (Continued)

force waveform same side of each steel rail are disposed at an angle of 90° with each other.

9 Claims, 8 Drawing Sheets

(51) Int. Cl.
  *B61L 27/57* (2022.01)
  *G01G 19/04* (2006.01)
  *G01L 1/04* (2006.01)

(56) References Cited

U.S. PATENT DOCUMENTS

| | | | | |
|---|---|---|---|---|
| 7,216,558 | B2* | 5/2007 | Kumar | B61L 1/02 73/866.5 |
| 7,364,123 | B2* | 4/2008 | Welles, II | B61L 23/00 246/270 R |
| 7,403,296 | B2* | 7/2008 | Farritor | G01N 3/48 356/614 |
| 7,717,004 | B2* | 5/2010 | Kumar | H03M 7/30 73/866.5 |
| 7,755,774 | B2* | 7/2010 | Farritor | B61K 9/08 356/614 |
| 7,866,569 | B2* | 1/2011 | Cadwell | E01B 3/46 238/35 |
| 8,305,567 | B2* | 11/2012 | Hesser | G01M 17/10 356/237.1 |
| 8,727,228 | B2* | 5/2014 | Djerf | B61L 27/40 238/85 |
| 8,944,677 | B2* | 2/2015 | Agostini | G01J 5/532 374/2 |
| 9,145,152 | B2* | 9/2015 | Agostini | G01J 5/0022 |
| 9,423,305 | B2* | 8/2016 | Agostini | B61K 9/06 |
| 9,556,564 | B2* | 1/2017 | Djerf | E01B 3/46 |
| 9,581,487 | B2* | 2/2017 | Warzecha | G01L 1/22 |
| 10,040,463 | B2* | 8/2018 | Singh | B61L 23/048 |
| 10,081,376 | B2* | 9/2018 | Singh | G06F 18/22 |
| 10,513,280 | B2* | 12/2019 | Mian | B61L 27/57 |
| 2005/0072252 | A1* | 4/2005 | Kumar | B61L 1/02 73/866.5 |
| 2006/0118678 | A1* | 6/2006 | Wells | B61L 23/00 246/121 |
| 2006/0144129 | A1* | 7/2006 | Farritor | G01N 3/48 73/81 |
| 2007/0107620 | A1* | 5/2007 | Wagner | A63H 19/30 104/53 |
| 2007/0204705 | A1* | 9/2007 | Kumar | B61L 1/08 73/866.5 |
| 2008/0304065 | A1* | 12/2008 | Hesser | E01B 35/00 356/400 |
| 2008/0304083 | A1* | 12/2008 | Farritor | B61K 9/08 356/614 |
| 2010/0170956 | A1* | 7/2010 | Cadwell | E01B 3/46 238/29 |
| 2010/0194533 | A1* | 8/2010 | Sullivan | H04Q 9/00 340/10.1 |
| 2012/0091287 | A1* | 4/2012 | Djerf | E01B 3/00 238/104 |
| 2013/0032674 | A1* | 2/2013 | Agostini | G01J 5/0808 246/169 D |
| 2013/0094535 | A1* | 4/2013 | Agostini | G01J 5/532 374/2 |
| 2015/0131696 | A1* | 5/2015 | Agostini | G01J 5/53 374/2 |
| 2016/0069733 | A1* | 3/2016 | Warzecha | G01G 19/12 177/136 |
| 2017/0066459 | A1* | 3/2017 | Singh | G06F 18/2431 |
| 2017/0106885 | A1* | 4/2017 | Singh | B61L 23/042 |
| 2017/0106887 | A1* | 4/2017 | Mian | B61L 3/02 |

FOREIGN PATENT DOCUMENTS

| | | |
|---|---|---|
| CN | 1951746 | 4/2007 |
| CN | 101672687 | 3/2010 |
| CN | 104880274 | 9/2015 |
| CN | 105444853 | 3/2016 |
| CN | 105651441 | 6/2016 |
| CN | 106494454 | 3/2017 |
| CN | 206583519 | 10/2017 |

OTHER PUBLICATIONS

Feng et al.,. et al. Compact Optical Fiber 3D Shape Sensor Based on a Pair of Orthogonal Tilted Fiber Bragg Gratings. Sci Rep 5, 17415 (2015). https://doi.org/10.1038/srep17415 (Year: 2015).*
Pan et al. (2017). Distributed optical fiber vibration sensor based on Sagnac interference in conjunction with OTDR. Optics Express. 25. 20056. 10.1364/OE.25.020056. (Year: 2017).*
Tam et al., Fibre Bragg Grating Sensors for Smart Railway Monitoring, in Photonics and Fiber Technology 2016 (ACOFT, BGPP, NP), OSA Technical Digest (online) (Optica Publishing Group, 2016), paper BM4B.4. (Year: 2016).*
Zhao et al., Wide Range Fiber Displacement Sensor Based on Bending Loss, Journal of Sensors, vol. 2016, Article ID 4201870, 5 pages, 2016. https://doi.org/10.1155/2016/4201870 (Year: 2016).*
Wang et al., (2005). A shear and plantar pressure sensor based on fiber-optic bend loss. Journal of rehabilitation research and development. 42. 315-25. 10.1682/JRRD.2004.07.0076. (Year: 2005).*

* cited by examiner

OVERLOAD AND UNBALANCED LOAD DETECTING SYSTEM FOR RAILWAY AND DETECTING METHOD

CROSS-REFERENCE TO RELATED APPLICATION

This application is a continuation of international PCT application Ser. No. PCT/CN2018/072024 filed on Jan. 10, 2018. The entirety of the above-mentioned patent application is incorporated herein by reference and made a part of this specification.

BACKGROUND

Technical Field

This application relates to a field of overload and unbalanced load detection for a railway, and more particularly, to an overload and unbalanced load detecting system for a railway and a detecting method.

Description of Related Art

Figure 1:
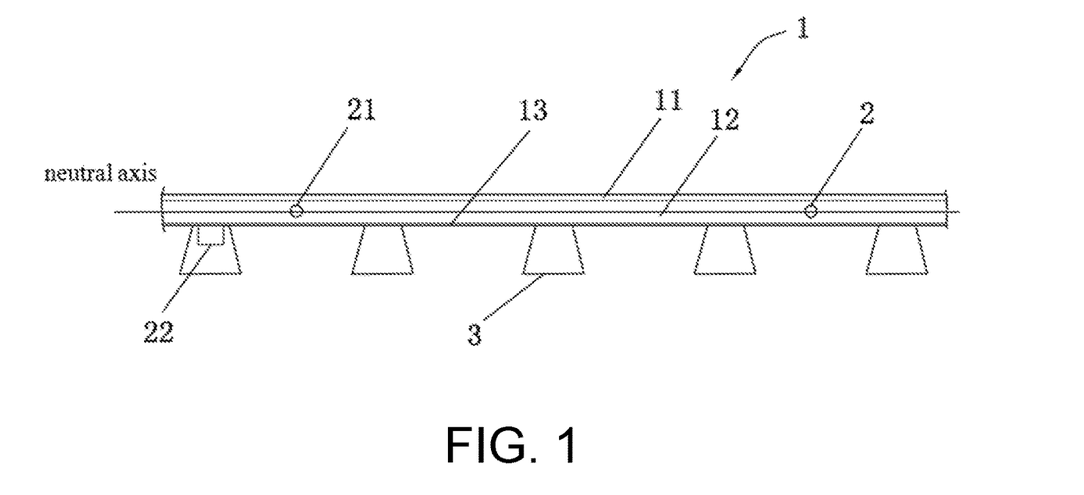
FIG. 1 is a structural schematic view of a steel rail in the background art.

An overload and unbalanced load detecting system on a railway is weighting security equipment used for a railway transportation system. A combined plate-mode sensor and a shear-stress sensor are used in the existing overload and unbalanced load detecting system on the railway for measuring the overload and unbalanced load of a running vehicle, in which the plate-mode sensor is used as a main weighting means and the shear-stress sensor is used as an axle counting tool and an auxiliary weighting means. Among them, a strain gauge, a conventional mechanical sensitive element, is adopted as the plate-mode sensor and the shear-stress sensor, and attached to a steel-made elastic carrier before mounting it on the railway. A specific mounting can be seen in FIG. 1, which is a schematic view of one steel rail. The other one is symmetrical to this steel rail, the shear-stress sensor 21 is fixed at a rail web 12 of the steel rail 1, and the plate-mode sensor 22 is fixed at a rail sleeper 3 of a specially made steel rail 1. Specifically, after drilling a hole at a neutral axis of the steel rail 1, the shear-stress sensor 21 is mounted inside the hole, and a distance between two adjacent rail sleepers is usually 600 mm. In a detecting process, during a time period from the time when the vehicle enters a detection area to the time when the vehicle leaves the detection area, the shear-stress sensor and the plate-mode sensor will output a shear-stress waveform and a pressure waveform shown in FIG. 2, respectively, which are synthesized to form a measuring data platform section with a length of 1200 mm. Each axle of the running vehicle can be weighed and measured. For the purpose of ensuring the measurement accuracy of the dynamically running vehicle, a plurality of measuring data platform sections should be disposed at the steel rail. The weight of the whole vehicle is measured and the degree of overload and unbalanced load is detected by axle measurement or bogie measurement after the synthesized signal is data processed. This measurement method can meet an acceptance standard of the national railway measuring and metering station and the practical accuracy requirements for measuring overload and unbalanced load when the speed is below 70 km/h.

However, this measurement method suffers from many disadvantages. Firstly, a specially made rail sleeper (concrete sleeper or steel sleeper) has to be used, that is, the specially made rail sleeper should be used to replace an ordinary rail sleeper when this overload and unbalanced load detecting system is mounted at the railway, which requires a large amount of construction on site. Secondly, it is costly to make the plate-mode sensor from the strain gauge. Thirdly, it is necessary to drill holes at the rail web when the shear stress sensor is mounted, which degrades the structural strength of the steel rail, reduces the service life of the steel rail, and causes a certain security risk, which, however, will be subjected to a strong opposition from the railway engineering department.

Due to the above-mentioned disadvantages existing in this measurement method, new measurement methods have been sought to replace this measurement method in the art. One of the prior art is to adopt the shear-stress sensor alone to detect overload and unbalanced load. For example, in an overload and unbalanced load detecting system provided by Rogers Corporation in the U.S., a strain gauge is adopted to make the shear-stress sensor which is glued or welded at the rail web of the steel rail with a length of 15 m; and the strain gauge is also adopted to make the arc shear-stress sensor which is spaced apart at the rail web of the specialized steel rail by Kili sensing technology Co., Ltd. in China. The above-mentioned two methods avoid the disadvantages of drilling holes at the steel rail, and avoid the construction method of combining the specially made rail sleeper with the plate-mode sensor, but there are still disadvantages described as follow. Firstly, a specialized steel rail processed and assembled in advance must be replaced on site, which takes a strict requirement for the distance between rail sleepers on site and a large amount of construction on site. Secondly, a conventional sensor has a weak capacity against electromagnetic interference, in which case a transmission distance of the signal is short, which is easy to be broken down due to a thunder stroke effect. In addition, the glue of Rogers Corporation in the U.S. is special and expensive. The welding is full welding which has a high requirement for processing a bonding surface, and the service life of gluing is limited. Argon-arc welding is adopted by the Kili sensing technology Co., Ltd. in China to weld the arc shear-stress sensor at the rail web, however, this is not allowed in the railway on the construction site according to a national standard.

Another prior art, a Chinese invention patent application applied by our company with a publication number of CN105444853A, discloses a fiber-optic detecting device which uses the steel rail as an elastomer, including a shear-stress detecting device and a pressure detecting device, in which the shear-stress detecting device is formed by fixedly disposing fiber-optic sensitive elements at two sides of the rail web of the steel rail, a pressure detecting device is formed by disposing a fiber-optic sensitive element at a plate-mode elastomer placed between the steel rail and the rail sleeper, and detecting the overload and unbalanced load on the railway is achieved by measuring the shear-stress and pressure acting on the steel rail at the same time. In this application, the fiber-optic sensor is adopted as the measuring element so that measured data is more accurate and resistance against the electromagnetic interference is higher. However, the specially made sleeper and plate-mode sensor still need to be mounted in this method which requires a large amount of construction.

SUMMARY

At one aspect, this application provides an overload and unbalanced load detecting system for a railway which plays a role of detecting overload and unbalanced load for the railway with higher accuracy based on a mounting position and a number of sensing elements.

In one embodiment, an overload and unbalanced load detecting system for a railway includes at least one steel rail. A rail web of each steel rail between every two adjacent rail sleepers is provided with two sampling points at two sides, respectively, the two sampling points on one side are symmetrically disposed about the steel rail with respect to the two sampling points on the other side, a fiber-optic sensitive element used for continuously measuring a load is obliquely fixed at each sampling point which is disposed at a neutral axis of the steel rail, and two fiber-optic sensitive elements on a same side of each steel rail are disposed at an angle of 90° with each other.

In another embodiment, an overload and unbalanced load detecting system for a railway includes a steel rail used as a force bearing carrier of fiber-optic sensitive elements. A rail web of each steel rail between every two adjacent rail sleepers is provided with two sampling points at each side, the sampling points on one side are symmetrically disposed about the steel rail with respect to the sampling points on the other side, the fiber-optic sensitive element used for continuously measuring a load when a train passes through the two sampling points is obliquely fixed at each of the sampling points, the sampling points are disposed at a neutral axis of the steel rail, and two fiber-optic sensitive elements on a same side of each steel rail are disposed at an angle of 90° with each other. The two sampling points are configured to be equidistant from a center of spacing between the two adjacent rail sleepers, and an effective data collecting section is formed between the two sampling points; force acting on the two sampling points on a same side is collected by the fiber-optic sensitive elements to obtain two shear-stress waveforms when the train passes through the two sampling points, and the two shear-stress waveforms are synthesized to form an approximately square effective data collecting section having peak values of the two shear-stress waveforms as end points.

By adopting the above technical solution, the fiber-optic sensitive element is disposed at the sampling point of the neutral axis, so that the fiber-optic sensitive element outputs a shear-stress waveform when the steel rail is deformed by force. The two fiber-optic sensitive elements on the same side of the steel rail are disposed at an angle of 90°, which ensures that the shear-stress waveforms output from the two fiber-optic sensitive elements are complementary when the overload and unbalanced load detection is carried out, so as to form a data range that can be collected during the whole detection process, guaranteeing the detection accuracy. In addition, the two sampling points on one side are symmetrically disposed about the steel rail with respect to the two sampling points on the other side in order to overcome the interference caused by the swinging when the train is running in S-shape curve.

Further, each of the fiber-optic sensitive elements is disposed at an angle of 40-50° relative to the neutral axis of the steel rail.

By adopting the above technical solution, a shear-stress acting on the steel rail can be collected when the angle is 40-50°.

Further, each of the fiber-optic sensitive elements is disposed at an angle of 45° relative to the neutral axis of the steel rail.

By adopting the above technical solution, each of the fiber-optic sensitive elements is disposed at an angle of 45° relative to the neutral axis of the steel rail which facilitates the calculating and processing of the output waveform.

Further, a center point of each of the fiber-optic sensitive elements coincides with a respective one of the sampling points.

By adopting the above technical solution, a wave peak of the shear-stress waveform is consistent with a wave trough of the shear-stress waveform which facilitates calculating and processing.

Further, the fiber-optic sensitive elements at two sides are disposed symmetrically about the steel rail.

Further, a distance between the two sampling points on the same side of the same steel rail is not less than 250 mm.

By adopting the above technical solution, under the premise that the sampling point cannot coincide with a fulcrum of the rail sleeper, the distance between two sampling points should be as long as possible. Since the distance between two adjacent rail sleepers is 600 mm in China, the distance between two sampling points should be as greater than 250 mm as possible excluding the occupied length of the rail sleeper.

Further, each of the fiber-optic sensitive elements is fixed at the steel rail by cold spot welding.

By adopting the above technical solution, the cold spot welding will not damage an overall metallographic structure of the steel rail, and cause the steel rail to anneal, or affect the strength of the steel rail.

Further, the overload and unbalanced load detecting system for the railway further includes a collecting device connected with the fiber-optic sensitive elements, a processing device connected with the collecting device for processing signals output from each of the fiber-optic sensitive elements, and a displaying device and a storing device respectively connected with the processing device.

By adopting the above technical solution, the collecting device is used for collecting the shear-stress waveforms output from a plurality of fiber-optic sensitive elements, the processing device is used for combining the collected shear-stress waveforms, so that an overload and unbalanced load detection data is obtained, and the storing device is used for storing historical information.

At a second aspect, the application provides a method for detecting an overload and unbalanced load on a railway, which plays a role of detecting overload and unbalanced load for the railway with higher accuracy based on a mounting position and a number of sensing elements.

In one embodiment, a method for detecting overload and unbalanced load on a railway comprises the following steps.

Providing two sampling points at a rail web of each steel rail between every two adjacent rail sleepers at two sides, respectively, symmetrically disposing the sampling points on one side about the steel rail with respect to the sampling points on the other side, obliquely fixing a fiber-optic sensitive element used for continuously measuring a load when a train passes through the two sampling points at each of the sampling points, disposing the sampling points on a neutral axis of the steel rail, and disposing two fiber-optic sensitive elements on a same side of each steel rail at an angle of 90° respect to each other; wherein the two sampling points are configured to be equidistant from a center of spacing between the two adjacent rail sleepers, and an effective data collecting section is formed between the two sampling points.

Collecting a force acting on the two sampling points on a same side by the fiber-optic sensitive elements to obtain shear-stress waveforms when the train passes through the two sampling points, synthesizing two shear-stress waveforms to form an approximately square effective data collecting section having peak values of the two shear-stress waveforms as end points; and obtaining a sum of signals output from the two fiber-optic sensitive elements disposed at the two sampling points to reflect the load of the train and an influence of vibration of the train on the load when the train is dynamically passing through, when the train passes through the approximately square effective data collecting section at a high speed.

Continuously providing a plurality of the effective data collecting sections between a plurality of the rail sleepers so as to obtain a complete load of the train and a complete waveform of the vibration of the train itself; and processing the data by a mathematical model to obtain an overload and unbalanced load detection data.

Displaying and storing the overload and unbalanced load detection data.

In summary, this application has the following beneficial effects.

1. There is no need to drill holes at the steel rail, which protects the strength of the steel rail and improves security performance of the railway.
2. The fiber-optic sensor is cold spot welded on the rail web of the steel rail, which increases the mounting strength and prolongs the service life compared with glue bonding.
3. There is no need to replace the specially made rail sleeper and steel rail or largely adjust the spacing of the rail sleeper, which enables mounting on the existing railway, greatly reducing the amount of construction, and reducing costs.
4. The resistance against electromagnetic interference is high and the lightning protection performance is good.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

This application will be further explained in detail below in combination with embodiments and figures.

Embodiment 1

Figure 2:
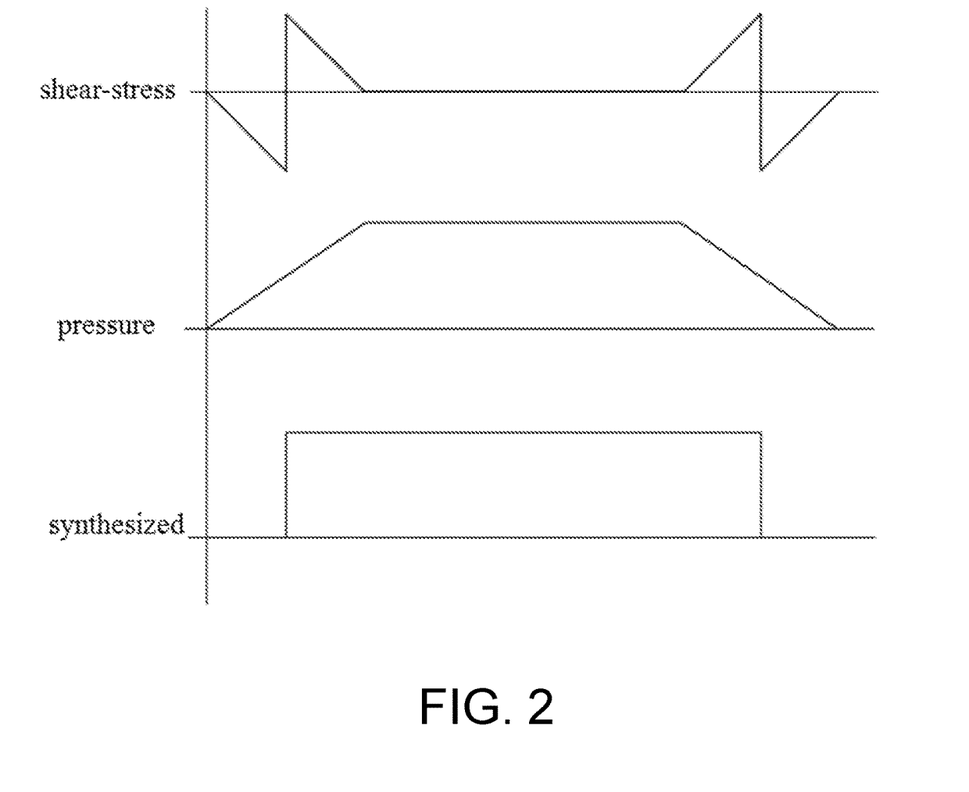
FIG. 2 is a waveform diagram of force and synthetic force in the background art.
Figure 3:
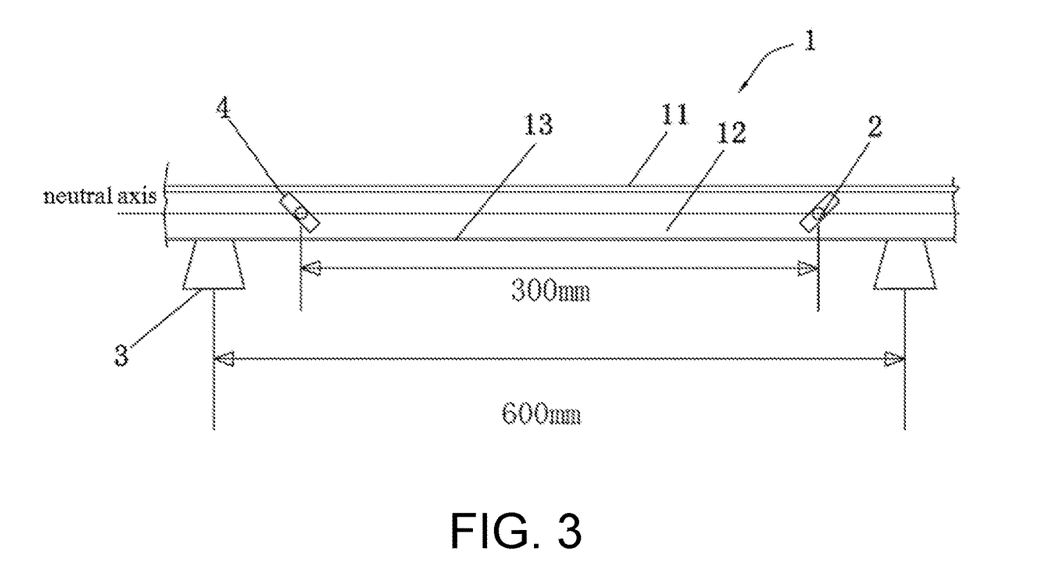
FIG. 3 is a mounting schematic view of fiber-optic sensitive elements of an overload and unbalanced load detecting system on a railway.
Figure 4:
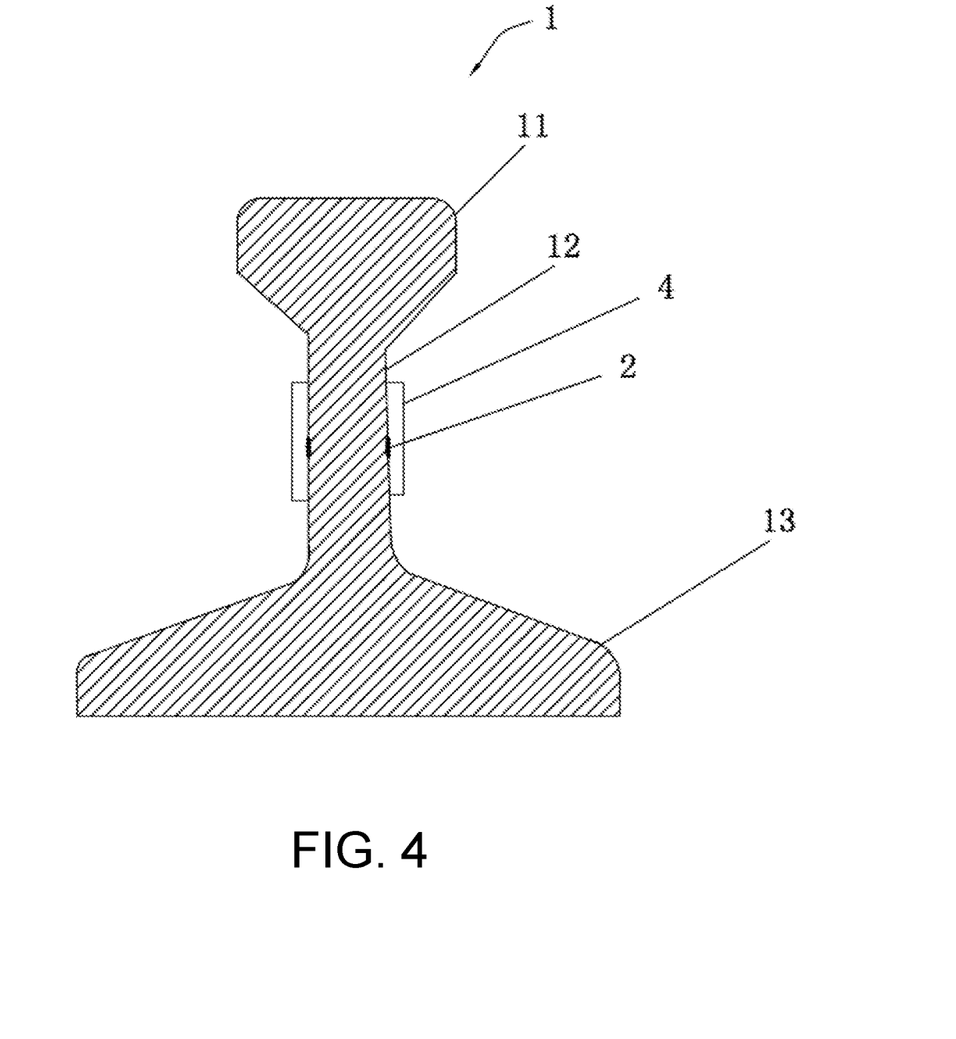
FIG. 4 is a sectional schematic view of a mounted steel rail.

An overload and unbalanced load detecting system on a railway is shown in FIG. 2 and FIG. 3. A fiber-optic sensitive element 4 is applied on a steel rail 1. The existing steel rail 1 includes a rail base 13, a rail web 12, and a rail head 11. The rail base 13 of the steel rail 1 is supported on the rail sleeper 3, and a distance between two adjacent rail sleepers 3 is 600 mm. The rail web 12 is provided with a special force bearing position, that is, a neutral axis which only bears shear-stress. In this system, the rail web 12 of each steel rail 1 between two adjacent rail sleepers 3 is provided with two sampling points at two sides, respectively, and the sampling points 2 on each side are symmetrically disposed with respect to the steel rail 1. A fiber-optic sensitive element 4 is obliquely fixed at each sampling point 2 which is disposed on the neutral axis of the steel rail 1, and two fiber-optic sensitive elements 4 on the same side of each steel rail 1 are disposed at an angle of 90° with each other. The fiber-optic sensitive element 4 is disposed at an angle of 40-50° relative to the neutral axis of the steel rail 1, in particular 45° to facilitate data processing after detection. The fiber-optic sensitive elements 4 at two sides are disposed symmetrically about the steel rail 1 (corresponding to the relative position and oblique angle of the sampling points 2). Under the premise that the sampling point 2 cannot coincide with a fulcrum of the rail sleeper 3, the distance between two sampling points should be as long as possible. Since the distance between two adjacent rail sleepers 3 is 600 mm in China, the distance between two sampling points 2, deducting the length occupied by the rail sleeper 3, should be greater than 250 mm as much as possible. In individual sleeper sections, the distance between fiber-optic mounting points is as uniform as possible, and the distance between the fiber-optic mounting point and a center of spacing between two adjacent sleepers is as equal as possible, so as to facilitate data processing and calculating.

Figure 5:
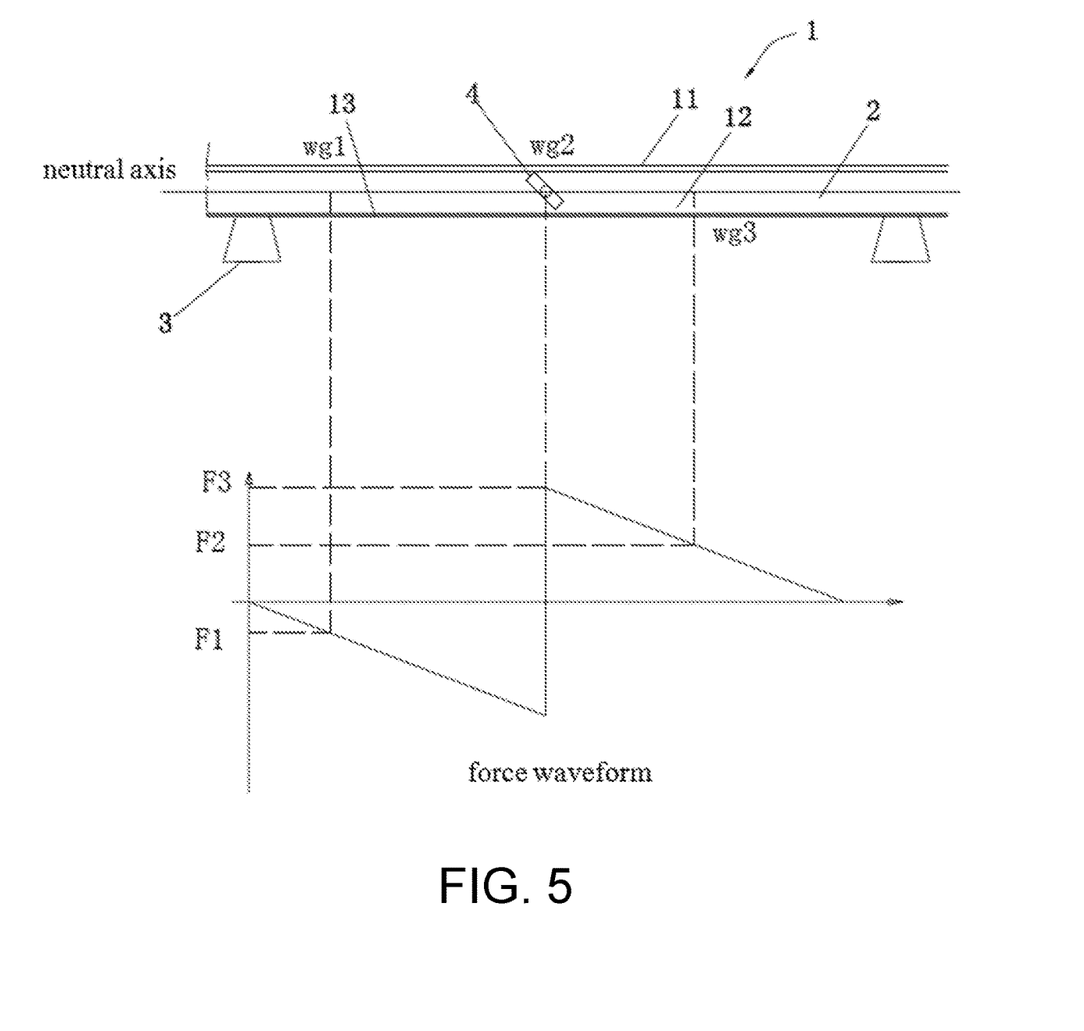
FIG. 5 is a force analysis diagram of a fiber-optic sensitive element on the steel rail.

Referring to FIG. 5, after mounting the fiber-optic sensitive element 4 described above in position, the steel rail 1 functions as a force bearing carrier of the fiber-optic sensors. When the steel rail 1 is deformed under stress, the characteristic that the output of the fiber-optic sensitive element 4 is a shear-stress waveform makes the optical fiber, as a new material, directly becomes a new detection device in the overload and unbalanced load detection system. By disposing the fiber-optic sensitive element 4 at the neutral axis of the steel rail 1, the fiber-optic sensitive elements 4 collect shear-stress signals, and the shear-stress waveform is shown in FIG. 5 when a train runs on the steel rail 1.

A formula of signals output from the fiber-optic sensitive element 4 is: $F=Wg*S*q/L$, in which Wg is a load, L is the distance between two sleepers used as the fulcrums of the steel rail 1, S is the distance from the force bearing point of the steel rail 1 to the fulcrum at one end, and q is an area of the force bearing point which is simplified to 1 here.

It can be seen from FIG. 5 and the formula as follows.

1) Taking the intersection of a center point of the fiber-optic and the neutral axis of the steel rail 1 as a dividing line, the value output from the fiber-optic respectively changes in positive and negative directions with the position of the force bearing point changes from the dividing line to fulcrums at two ends (the waveform will move up and down accordingly when the center point of the fiber-optic sensitive element does not coincide with the sampling point 2, which is not conducive to subsequent calculations, therefore, the center point of the fiber-optic sensitive element is aligned with the sampling point 2 as much as possible when being mounted; and furthermore, the waveform will also move left or right according to the position of the sampling point 2).

2) The value output from the fiber-optic is obtained by the formula: F=Wg*S*q/L which is linear, and the maximum value thereof is obtained when the force bearing point coincides with the intersection of the center point of the fiber-optic and the neutral axis (in both positive and negative directions).

3) The maximum value output from the fiber-optic is only in linear correlation with the load in direct proportion when the distance between two sleepers is fixed and the position of the fiber-optic is fixed.

Referring to FIG. 5, although a peak value can be obtained, it is difficult to get the maximum peak value of the signal output from the fiber-optic (other values are determined by the ratio of S/L) when the train is running at a high speed and the sampling rate of the existing fiber-optic data collecting apparatus is only 1000/s, that is, an effective data collecting section is too short to collect effective data which can ensure measurement accuracy, and an error caused by this can reach even 6%.

Figure 6:
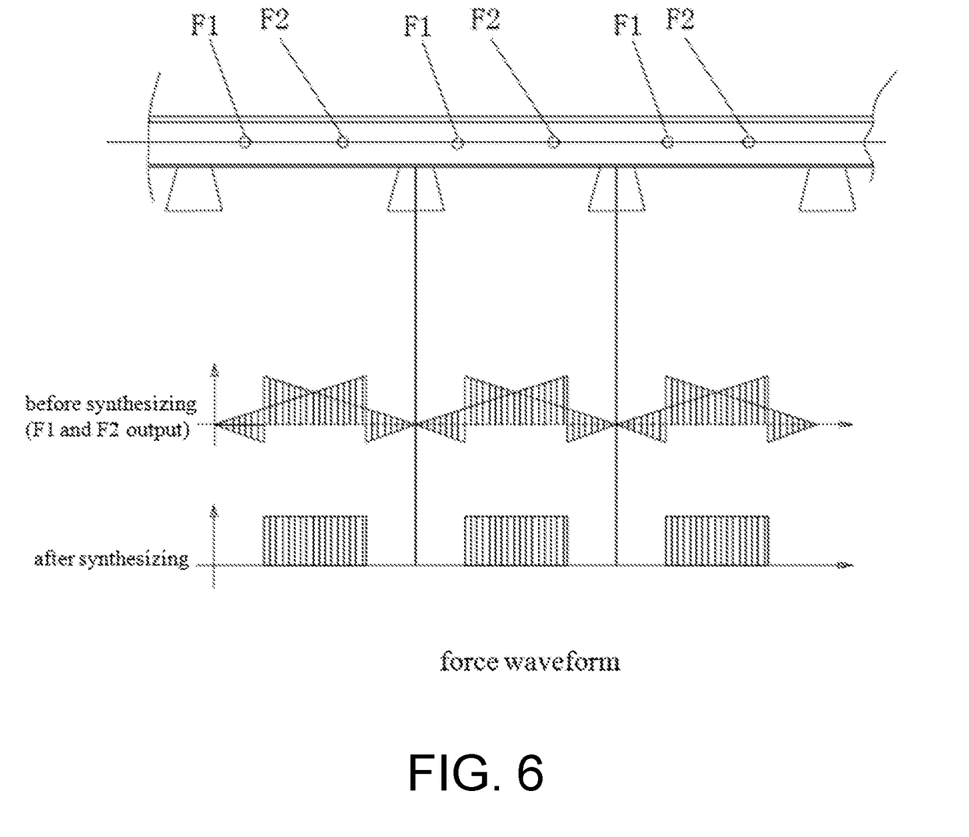
FIG. 6 is a force analysis diagram of an overload and unbalanced load detecting system on the railway.

Therefore, there provided two sampling points 2, as shown in FIG. 6, and the purpose of providing two fiber-optic mounting points in one sleeper section is to artificially create an effective data collecting section which is short but can increase the probability of obtaining effective data (refer to the synthesized waveform in FIG. 6). Although error may exist in the collecting section in practice, the error can be infinitely reduced by a weighted average method. A plurality of effective data collecting sections may be disposed continuously or discontinuously in a plurality of sleeper sections, which can steadily improve the measurement accuracy. According to calculation and experiment: the number of collecting sections should be more than 8 when the vehicle runs at a speed below 70 km/h.

In view of the fact that the train is swinging left or right in S-shaped curve when it is in a running state, and the force bearing point contacted between the wheel and the steel rail 1 is not always on a center line of the top surface of the rail, the signal output from the fiber-optic sensor will be interfered due to the swing of the wheel if fiber-optic mounting points are only provided at the neutral axis of the rail web 12 at one side, so that the same load cannot produce the same output. Therefore, fiber-optic sensors are fixed at the same angle at corresponding positions of two sides of the neutral axis of the rail web 12 of the steel rail 1. When the wheel passes through the fiber-optic mounting points on the steel rail 1, and the synthesized signal output from two fiber-optic sensors corresponding to the fiber-optic mounting points disposed at two sides of the rail web 12 is always linear correlation with the load in direct proportion, in spite of the swing of the wheels.

Figure 7:
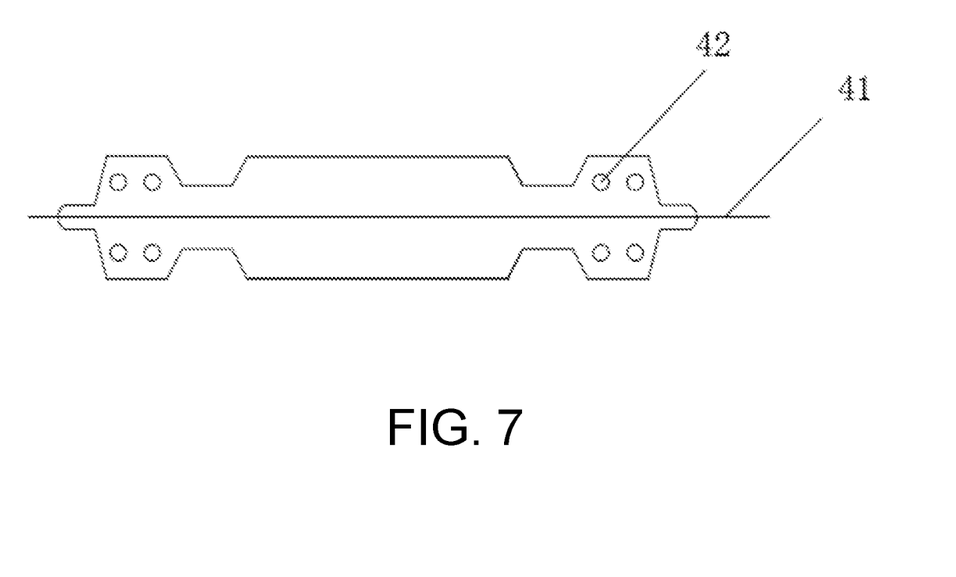
FIG. 7 is a schematic view of mounted fiber-optic sensitive element structure and welding-spots.

The structure of the fiber-optic sensitive element is generally shown in FIG. 7, and methods which can be used at present for mounting the fiber-optic sensitive element 4 at the sampling point 2 are: 1. sticking by glue, 2. spot-welding and full-welding by an additional carrier, 3. laser spot-welding, and 4. simulated laser cold spot welding. In this application, the simulated laser cold spot welding is preferred, and the shape of the fiber-optic sensor is determined from this. It is only necessary to perform a cold spot welding at a welding-spot 42 corresponding to the fiber-optic 41. The existing gluing cannot guarantee long-time stability, spot-welding and full-welding are not allowed to be performed on the railway site, and the equipment of laser spot-welding is bulky and expensive. On the contrary, the simulated laser cold spot welding will not damage an overall metallographic structure of the steel rail 1, cause the steel rail 1 to anneal, or affect the strength of the steel rail 1, and instead can overcome an unsafe factor of drilling holes at the rail web 12 for mounting the shear-stress sensor 21.

Figure 8:
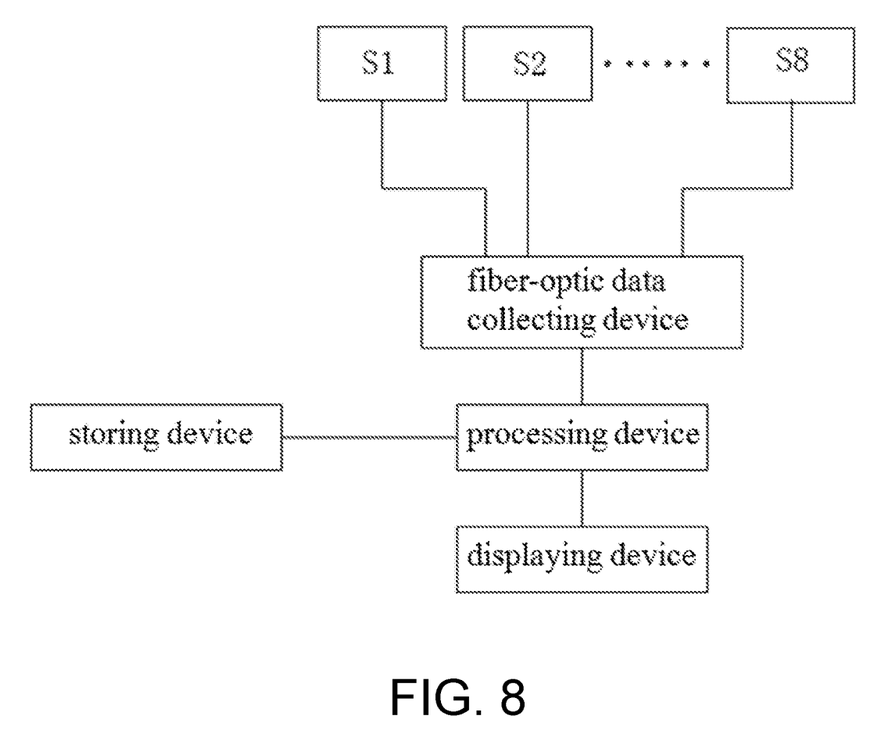
FIG. 8 is a block diagram of an overload and unbalanced load detecting system on the railway.

Referring to FIG. 8, this system further includes a collecting device connected with the fiber-optic sensitive element 4, a processing device connected with the collecting device for processing signals output from individual fiber-optic sensitive elements 4, and a displaying device and a storing device respectively connected with the processing device.

Figure 9:
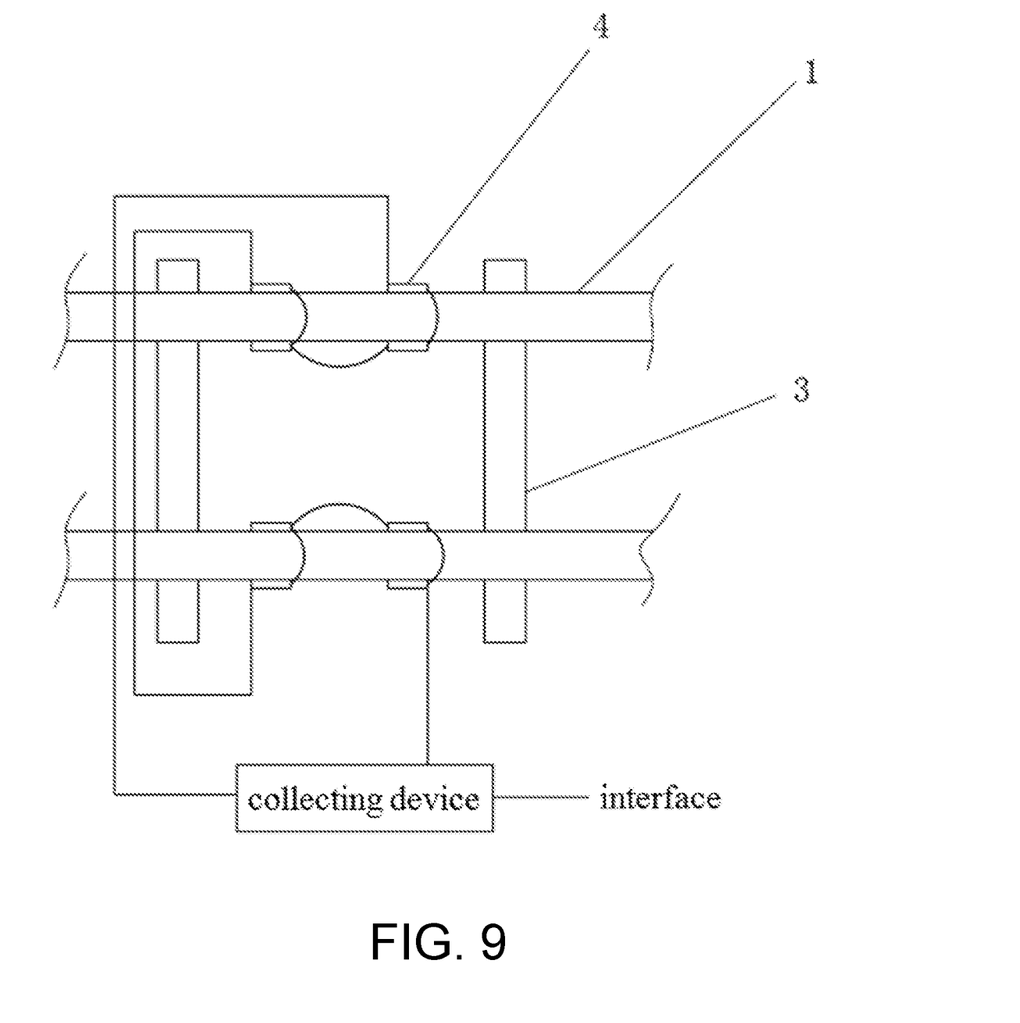
FIG. 9 is a schematic view of a circuit connection of a fiber-optic sensitive element.

Referring to FIG. 9, the connection with the fiber-optic sensitive element 4 is a series connection in one embodiment.

Embodiment 2

An overload and unbalanced load detecting method for a railway includes the following steps.

Providing two sampling points 2 at a rail web 12 of each steel rail 1 at two sides between every two adjacent rail sleepers 3, respectively, symmetrically disposing the two sampling points 2 on one side about the steel rail 1 with respect to the two sampling points 2 on the other side, obliquely fixing a fiber-optic sensitive element 4 at each sampling point 2, disposing each sampling point 2 at a neutral axis of the steel rail 1, and disposing two fiber-optic sensitive elements 4 on the same side of each steel rail 1 at an angle of 90° respect to each other. Collecting force acting on the two sampling points 2 on the same side by the fiber-optic sensitive elements 4 to form shear-stress waveforms, synthesizing two shear-stress waveforms, and obtaining an overload and unbalanced load detection data; and displaying and storing the overload and unbalanced load detection data.

These embodiments are only an explanation of this application, and do not limit the protection scope of this application. Those skilled in the art can make modifications without creative contribution to this embodiment after reading this specification, and it is protected by the patent law as long as it is within the scope of the claims of this application.

What is claimed is:

1. An overload and unbalanced load detecting system for a railway, comprising at least one steel rail used as a force bearing carrier of fiber-optic sensitive elements, wherein a rail web of each of the at least one steel rail between every two adjacent rail sleepers is provided with two sampling points at each side, the two sampling points on one side are symmetrically disposed about a corresponding one of the at least one steel rail with respect to the two sampling points on a second-side, the two sampling points at each side are disposed on a neutral axis of the corresponding one of the at least one steel rail, one fiber-optic sensitive element of the fiber-optic sensitive elements configured for continuously measuring a load when a train passes through the two sampling points at each side is fixed at each of the sampling points obliquely relative to the neutral axis of the corresponding one of the at least one steel rail in a plane where a side of the corresponding one of the at least one steel rail is located, and two of the fiber-optic sensitive elements on a same side of each of the at least one steel rail are disposed at an angle of 90° with each other in a plane where the side of the corresponding one of the at least one steel rail is located; wherein the two sampling points at each side are configured to be equidistant from a center of spacing between the two adjacent rail sleepers, and an effective data collecting section is formed between the two sampling points at each side;

force acting on the two sampling points on a same side is collected by the fiber-optic sensitive elements to obtain two shear-stress waveforms when the train passes through the two sampling points on the same side, and the two shear-stress waveforms are synthesized to form an approximately square effective data collecting section having peak values of the two shear-stress waveforms as end points; and when the train passes through the approximately square effective data collecting section at a high speed, data of signals continuously output from two of the fiber-optic sensitive elements disposed at the two sampling points on the same side are synthesized to reflect the load of the train and an influence of vibration of the train on the load when the train is dynamically passing through; a plurality of the approximately square effective data collecting sections are continuously disposed between a plurality of the rail sleepers so as to obtain the load of the train and a complete waveform of the vibration of the train when the train is dynamically running; and an overload and unbalanced load detection data is accurately obtained by data analyzing and processing.

2. The overload and unbalanced load detecting system for the railway according to claim 1, wherein each of the fiber-optic sensitive elements is disposed at an angle of 40-50° relative to the neutral axis of the corresponding one of the at least one steel rail.

3. The overload and unbalanced load detecting system for the railway according to claim 2, wherein each of the fiber-optic sensitive elements is disposed at an angle of 45° relative to the neutral axis of the corresponding one of the at least one steel rail.

4. The overload and unbalanced load detecting system for the railway according to claim 1, wherein a center point of each of the fiber-optic sensitive elements coincides with a respective one of the two sampling points at each side.

5. The overload and unbalanced load detecting system for the railway according to claim 4, wherein the fiber-optic sensitive elements at two sides are disposed symmetrically along the corresponding one of the at least one steel rail.

6. The overload and unbalanced load detecting system for the railway according to claim 1, wherein a distance between the two sampling points on the same side of a same steel rail of the at least one steel rail is not less than 250 mm.

7. The overload and unbalanced load detecting system for the railway according to claim 1, wherein the fiber-optic sensitive elements are fixed on the at least one steel rail by cold spot welding.

8. The overload and unbalanced load detecting system for the railway according to claim 1, further comprising a collecting device connected with the fiber-optic sensitive elements, a processing device connected with the collecting device for processing signals output from each of the fiber-optic sensitive elements, and a displaying device and a storing device respectively connected with the processing device.

9. A method for detecting overload and unbalanced load on a railway, the method comprising the following steps:

providing two sampling points at a rail web of each steel rail between every two adjacent rail sleepers at two sides, respectively, symmetrically disposing sampling points on one side about the steel rail with respect to sampling points on a second-side, disposing the sampling points at each side on a neutral axis of the steel rail, fixing a fiber-optic sensitive element configured for continuously measuring a load when a train passes through the two sampling points at each of the sampling points obliquely relative to the neutral axis of the steel rail in a plane where a side of the steel rail is located, and disposing two fiber-optic sensitive elements on a same side of each steel rail at an angle of 90° respect to each other in a plane where the side of the steel rail is located; wherein the two sampling points at each side are configured to be equidistant from a center of spacing between the two adjacent rail sleepers, and an effective data collecting section is formed between the two sampling points at each side;

collecting force acting on the two sampling points on a same side by the fiber-optic sensitive elements to obtain shear-stress waveforms when the train passes through the two sampling points on the same side, and synthesizing two shear-stress waveforms to form an approximately square effective data collecting section having peak values of the two shear-stress waveforms as end points; and obtaining a sum of signal output from the two fiber-optic sensitive elements disposed at the two sampling points on the same side when the train passes through the approximately square effective data collecting section at a high speed to reflect the load of the train and an influence of vibration of the train on the load when the train is dynamically passing through;

continuously providing a plurality of the approximately square effective data collecting sections between a plurality of the rail sleepers so as to obtain the load of the train and a complete waveform of the vibration of the train when the train is dynamically running; and analyzing and processing the data to accurately obtain an overload and unbalanced load detecting data; and displaying and storing the overload and unbalanced load detection data.

* * * * *